3,026,173
PREPARATION OF DIHALODIFLUOROSILANES
Donald C. Pease, Wilmington, Del., assignor to E. I. du Pont de Nemours and Company, Wilmington, Del., a corporation of Delaware
No Drawing. Filed Feb. 25, 1958, Ser. No. 717,297
8 Claims. (Cl. 23—14)

This invention relates to dihalodifluorosilanes, that is, compounds of the formula $SiF_2X_2$, where X is a halogen other than fluorine, and has as its principal object provision of a new method for the preparation of these compounds.

This application is a continuation-in-part of copending application Serial No. 573,075, filed by D. C. Pease on March 22, 1956, now U.S. Patent 2,840,588, issued June 24, 1958.

Dihalodifluorosilanes are technically valuable chemicals. For example, it is known (U.S. Patent 2,465,339) that they react readily with mono- or polyhydric alcohols and thiols to give fluorinated esters of orthosilicic acid, which are useful in coating compositions, as plasticizers for polymeric materials, etc. A large number of organic and inorganic compounds containing the —$SiF_2$— group can be prepared from dihalodifluorosilanes because of the greater reactivity, as compared with fluorine, of the other halogen present therein.

Dihalodifluorosilanes have been previously prepared by the reaction of hexafluorodisilane with halogens in accordance with the illustrative equation

$$Si_2F_6 + Cl_2 \rightarrow SiF_2Cl_2 + SiFCl_3 + SiF_4$$

[Schumb and Gamble, J. Am. Chem. Soc. 54, 3943 (1932); Schumb and Anderson, ibid, 58, 984 (1936)]. Such reactions are explosive or flame-producing and give a mixture of products, besides requiring the separate preparation of hexafluorodisilane. A more satisfactory method [U.S. Patent 2,395,826; Lindsey, J. Am. Chem. Soc. 73, 371 (1951)], for the preparation of $SiF_2Cl_2$ involves heating a mixture of $SiF_4$ and $SiCl_4$ at about 800° C. However, this method required the use of both silicon tetrahalides, and it gives a mixture of all the possible mixed silicon halides.

It has now been found that the dihalodifluorosilanes can be prepared essentially free from other halofluorosilanes by a simple process in which silicon tetrafluoride, a cheap and readily obtainable material, is the sole silicon halide reactant.

In accordance with this invention, dihalodifluorosilanes are prepared by a process which comprises bringing silicon tetrafluoride in contact, at a temperature in the range from about 1100° C. to about 1400° C. and at an absolute pressure not exceeding 50 mm. of mercury, with silicon in the form of elemental silicon, silicon carbide, silicon-metal alloys or binary silicides of polyvalent metals, and immediately bringing the reaction product in contact with a halogen having an atomic number between 17 and 53, inclusive.

The reaction product of silicon tetrafluoride with silicon under the conditions stated above is believed to consist of, or contain, difluorosilylene, $SiF_2$, also called silicon difluoride or silicon subfluoride. Below its temperature of formation, difluorosilylene is capable only of transitory existence unless it is immediately cooled (quenched) to very low temperatures, e.g., that of liquid nitrogen. If this is not done, difluorosilylene disproportionates to silicon and silicon tetrafluoride or polymerizes. However, it is possible to bring difluorosilylene in combination with halogens in the temperature range where it is unstable, provided contact with the halogen is effected as soon as possible after formation of the difluorosilylene, before it has had time to decompose to an appreciable extent.

To obtain difluorosilylene in the reaction of silicon tetrafluoride with silicon, silicon carbide, polyvalent metal silicides, or metal/silicon alloys, it is essential that the reaction be conducted under carefully controlled conditions of temperature and pressure. The temperature in the reaction zone should be at least 1100° C., since little or no reaction takes place at lower temperatures. The upper limit of temperature is not particularly critical but preferably does not exceed the melting point of silicon, about 1400° C., since at higher temperatures silicon appears in the reaction products in undesirable amounts. The preferred reaction temperature is within the range of 1200° to 1300° C.

The absolute pressure in the system should not exceed about 50 mm. of mercury. Difluorosilylene does not form in appreciable amounts at higher pressures, possibly because it disproportionates too rapidly to silicon and silicon tetrafluoride. Preferably, the operating pressure should not exceed 30 mm. of mercury, and still more preferably it is below about 10 mm. of mercury.

To obtain the dihalodifluorosilanes in satisfactory yields it is essential that contact between the halogen and difluorosilylene take place immediately after the formation of the latter. The permissible elapsed time between formation of difluorosilylene and contact with the halogen cannot be stated precisely since, for any given apparatus, it is primarily a function of the gas velocity, which in turn is a function of the feed rate and of the absolute pressure. Lowering the pressure results in higher gas velocities and a shorter elapsed time before the difluorosilylene and halogen come in contact. As a general rule, it can be said that the difluorosilylene should come in contact with the halogen not more than one second after its formation, and preferably within 0.1 to 0.001 second or even less. It is even possible to introduce the halogen at or near the zone of reaction between silicon and silicon tetrafluoride, thus making contact with the difluorosilylene essentially as it is formed.

The reactants in the process of this invention are silicon tetrafluoride, silicon and the desired halogen (chlorine, bromine or iodine). Silicon tetrafluoride is a gas at ambient temperatures and is commercially available as 96% $SiF_4$. Optimum results are obtained by the use of silicon tetrafluoride further purified by distillation, or sublimation, although it can be employed without further purification. The silicon reactant can be elemental silicon, either silicon per se which is preferred, or a silicon alloy, e.g., a ferrosilicon, for example a 50/50 ferrosilicon, or a binary polyvalent metal silicide, e.g., FeSi and $TiSi_2$, or carbon silicide (silicon carbide). Elemental silicon can be used as the technical product without purification, and either in the amorphous or crystalline form. Any binary polyvalent metal silicide can be used, the most useful of such compounds being calcium silicide, magnesium silicide, titanium silicide, chromium silicide, manganese silicide, iron silicide, cobalt silicide and nickel silicide. The solid reactant is best used in as finely divided form as possible to insure good reactivity. However, in fixed bed systems particle size must also be adjust to permit throughput of silicon tetrafluoride at efficient rates and to assure physical stability. Different particle size requirements are imposed if the solid reactant is handled as a "fluid" in counter-current flow systems. If desired, an inert carrier gas can be used, such as argon, helium, or nitrogen.

The difluorosilylene which forms in the hot reaction zone is immediately brought in contact with a halogen (chlorine, bromine or iodine) to form the desired dihalodifluorosilane. The halogen is preferably used in gaseous or vaporized form, but if desired it can also be used in liquid or solid form since the combination takes place even at low temperatures. Provided the time interval between formation of difluorosilylene and contact with the halogen is short enough, the halogen can be mixed with the gaseous product of the silicon tetrafluoride/silicon reaction at any desired temperature between about 1200° C. and about —50° C., or even lower. Since it is more convenient to use the halogen in a gaseous of vaporized state, the preferred procedure is to introduce the halogen in the gaseous offstream from the silicon tetrafluoride/silicon reaction at a temperature between about 1200° C. and 20° C., and to condense the resulting dihalodifluorosilane. If desired, however, the off-gas from the silicon tetrafluoride/silicon reaction can be quenched rapidly (within one second, preferably within 0.1–0.001 second) to a temperature not exceeding 0° C. and condensed on a cold wall, e.g., at liquid nitrogen temperature, where the condensed product is brought in contact with the halogen. The mixture is then allowed to warm up and the dihalodifluorosilane which forms is evaporated from the reaction product, care being taken to minimize the hazards due to the spontaneous inflammability of polydifluorosilylene when exposed to air.

This process gives dihalodifluorosilanes, $SiF_2X_2$, where X is chlorine, bromine or iodine, as essentially the sole halofluorosilanes. The other halofluorosilanes, i.e., the compounds $SiFX_3$ and $SiF_3X$, which are occasionally formed in very minor amounts, can be readily removed from the dihalodifluorosilanes by fractional distillation, as can the unreacted silicon tetrafluoride. In general, the yields of dihalfodifluorosilanes, based on the silicon tetrafluoride actually consumed, are very satisfactory.

The following nonlimiting examples illustrate the invention:

Example I

Bromine was reacted with difluorosilylene as follows: The apparatus was a ¾" bore quartz tube packed for a portion of its length, this portion being heated in an electric furnace (12" long), with lumps of silicon approximately cubical in shape and ¼" on edge. The inlet end of the tube was attached to a manometer and a gas burette containing gaseous silicon tetrafluoride. The outlet end of the tube led to a glass trap of the cold finger type, this trap being for the purpose of quenching and condensing the reaction products. The condensing trap was connected through other cold traps to a second manometer and a vacuum pump. The tubular quartz reactor was fitted, between the furnace and the quenching trap, with a side tube leading to a second gas burette, through which bromine could be introduced in gaseous form at any desired time. By regulating the flow of silicon tetrafluoride, the pressure on the inlet side was maintained at about 5 mm. By cooling the traps at the outlet end with liquid nitrogen (B.P. —196° C.), the gaseous products were removed so completely that the outlet pressure was of the order of 0.05 mm. The gas streams (bromine and off-gas from the silicon tetrafluoride/silicon reaction) were merged at a point, just beyond the hot silicon, where the temperature was about 350° C. Under these conditions it was estimated that the difluorosilylene came in contact with the bromine within considerably less than one-tenth of a second after leaving the hot zone.

After degassing the silicon in the tube by heating it to 1200° C. under a pressure of about 1 mm., the quenching trap was cooled with liquid nitrogen. Silicon tetrafluoride was then admitted through the first gas burette into the tube maintained at 1200° C., and bromine was admitted into the off-gas stream through the second gas burette. Addition of the reactants was adjusted so that reactions might occur according to the following equations:

$$\tfrac{1}{2}SiF_4 + \tfrac{1}{2}Si \rightarrow SiF_2$$
$$SiF_2 + Br_2 \rightarrow SiF_2Br_2$$

After about 0.16 mole of silicon tetrafluoride and 0.39 mole of bromine had been added, which required about 4.5 hours, the run was discontinued. The temperature of the quenching tube was gradually raised to 25° C. while the material which had accumulated in it was transferred to a still. Distillation gave dibromodifluorosilane, boiling at 15–18° C. (thermocouple temperature).

*Analysis.*—Calcd. for $SiBr_2F_2$: Br, 70.77%; F, 16.82. Found: Br, 70.24%; F, 16.52%.

Conversion of silicon tetrafluoride to dibromodifluorosilane was 68% and the yield, based on the silicon tetrafluoride consumed, was practically quantitative.

Example II

In this example bromine was reacted with difluorosilylene at a temperature of approximately 1200° C.

The apparatus was similar to that used in Example I. The pressure of the silicon tetrafluoride when it entered the reactor was about 50 mm. The pressure measured beyond the liquid nitrogen traps was about 0.05 mm. Silicon tetrafluoride reacted with silicon at 1280° C. The off-gas from the reaction then traversed an unpacked tube a distance of about 8" at 1280° C. and came in contact, within considerably less than one-tenth of a second, with a stream of bromine vapor at a point where the temperature was about 1200° C. The reaction product was quenched and condensed in the cold trap at —196° C.

Under these conditions, 0.37 mole of silicon tetrafluoride and 0.84 mole of bromine were introduced in the apparatus over a period of 20 hours, after which the condensate in the cold trap was allowed to warm up. It contained essentially no polymeric difluorosilylene. A gaseous material boiling below —78° C. and consisting principally of unreacted silicon tetrafluoride (0.28 mole) was first allowed to escape and the residual liquid was transferred to a still. After two distillations there was obtained 0.17 mole of dibromodifluorosilane, B.P. 15–16° C.

Example III

Bromine was reacted with difluorosilylene essentially as described in Example I except that the two reactants were merged at a temperature of about 25° C. The pressure at the point where the silicon tetrafluoride entered the apparatus was 5 mm. and the pressure downstream from the liquid nitrogen traps was about 0.1 mm. About 40% of the silicon tetrafluoride employed was converted to dibromodifluorosilane and most of the remainder was recovered in the cold traps.

Example IV

Iodine was reacted with difluorosilylene essentially as described in Example I for the reaction using bromine. Crystalline iodine was placed in a glass container connected by a glass tube to the tubular reactor beyond the hot reaction zone, and the container was warmed somewhat above room temperature to raise the vapor pressure of the iodine. The temperature of the silicon bed over which the silicon tetrafluoride passed was 1300° C. At the point where the iodine vapor merged with the off-gas from the silicon tetrafluoride/silicon reaction the temperature was 25–75° C. and the pressure was about 1 mm.

From 0.25 mole of iodine and 0.38 mole of silicon tetrafluoride there was obtained in the cold traps 0.11 mole of diiododifluorosilane, which on redistillation boiled at 85° C. There was also obtained 0.22 mole of polymeric difluorosilylene, together with unreacted silicon tetrafluoride.

Example V

Chlorine was reacted with difluorosilylene essentially as described in Example I for the reaction using bromine, except that the two reactants were merged at a temperature of 25° C. and that the molar ratio of the chlorine to the silicon tetrafluoride admitted to the apparatus was about 3:2. The pressure at the point where the silicon tetrafluoride entered the apparatus was 3 mm., and the pressure downstream from the coldtraps was about 0.03 mm. The temperature of the silicon bed was maintained at 1240–1275° C. After 0.29 mole of silicon tetrafluoride and 0.44 mole of chlorine had been introduced, which required about 4.5 hours, the volatile product which had collected in the quenching tube was transferred to a still. The material which boiled between −30 and −20° C. was shown by mass spectrographic analysis to contain about 0.1 mole of dichlorodifluorosilane.

Since obvious modification in the invention will occur to those skilled in the chemical arts, I propose to be bound solely by the appended claims.

The embodiments of the invention in which an exclusive property or privilege is claimed are defined as follows:

1. The process for the preparation of a dihalodifluorosilane which comprises bringing silicon tetrafluoride in contact, at a temperature in the range from about 1100° C. to about 1400° C. and at an absolute pressure of up to 50 mm. of mercury, with a member of the group consisting of elemental silicon, silicon alloys, silicon carbide, and binary polyvalent metal silicides and immediately thereafter bringing the reaction product, containing difluorosilylene in contact with a halogen having an atomic number between 17 and 53, inclusive.

2. The process for preparing dichlorodifluorosilane which comprises bringing silicon tetrafluoride in contact, at a temperature in the range from about 1100° C. to about 1400° C. and at an absolute pressure of up to 50 mm. of mercury, with a member of the group consisting of elemental silicon, silicon alloys, silicon carbide, and binary polyvalent metal silicides and immediately thereafter bringing the reaction product, containing difluorosilylene in contact with chlorine.

3. The process for preparing dibromodifluorosilane which comprises bringing silicon tetrafluoride in contact, at a temperature in the range from about 1100° C. to about 1400° C. and at an absolute pressure of up to 50 mm. of mercury, with a member of the group consisting of elemental silicon, silicon alloys, silicon carbide, and binary polyvalent metal silicides and immediately thereafter bringing the reaction product, containing difluorosilylene in contact with bromine.

4. The process for preparing diiododifluorosilane which comprises bringing silicon tetrafluoride in contact, at a temperature in the range from about 1100° C. to about 1400° C. and at an absolute pressure of up to 50 mm. of mercury, with a member of the group consisting of elemental silicon, silicon alloys, silicon carbide, and binary polyvalent metal silicides and immediately thereafter bringing the reaction product, containing difluorosilylene in contact with iodine.

5. The process of claim 1 including the additional and sequential step of recovering said dihalodifluorosilane.

6. The process of claim 2 including the additional and sequential step of recovering said dichlorodifluorosilane.

7. The process of claim 3 including the additional and sequential step of recovering said dibromodifluorosilane.

8. The process of claim 4 including the additional and sequential step of recovering said diiododifluorosilane.

References Cited in the file of this patent

UNITED STATES PATENTS

| | | |
|---|---|---|
| 1,157,668 | Boner | Oct. 26, 1915 |
| 2,395,826 | Hill | Mar. 5, 1946 |
| 2,865,706 | Fitch et al. | Dec. 23, 1958 |

FOREIGN PATENTS

| | | |
|---|---|---|
| 912,330 | Germany | May 28, 1954 |

OTHER REFERENCES

Groggins: Unit Processes in Organic Synthesis, 2nd ed., published by McGraw-Hill Book Co., Inc., 1938, pp. 165–192.

C. A. Jacobson: Encyclopedia of Chemical Reactions, publ. by The Reinhold Publ. Corp., N.Y. vol. VI, 1956, pp. 87 and 89.

J. H. Hildebrand: Reference Book of Inorganic Chemistry, publ. by the MacMillan Co., Revised ed., 1940, p. 298.

"The Redistribution Reaction in Substituted Fluorosilanes, Iodofluorosilanes," by Anderson, J.A.C.S., vol. 72, May 1950, pages 2091–93.